United States Patent
Hauck et al.

[11] Patent Number: 5,882,381
[45] Date of Patent: Mar. 16, 1999

[54] THERMAL DESORPTION SYSTEM

[75] Inventors: Gunther Hauck, Port Washington; Lynwood L. Socks, Cedarburg; Rodney H. Schueller, Port Washington; Robert Youmans, Grafton, all of Wis.; John W. Noland, Pittsburgh, Pa.; Wayne L. Read, Columbia, Ill.

[73] Assignee: Modern Equipment Company, Inc., Port Washington, Wis.

[21] Appl. No.: 828,042

[22] Filed: Mar. 27, 1997

[51] Int. Cl.⁶ .................................................. B01D 53/12
[52] U.S. Cl. .............................. 95/109; 34/131; 34/132; 34/169; 34/361; 34/412; 34/426; 34/431; 34/480; 95/111; 96/123; 96/150
[58] Field of Search ........................... 34/131, 132, 141, 34/143, 168, 169, 359, 361, 406, 412, 426, 431, 434, 480, 504, 506, 509; 95/99, 106, 108–112; 96/122, 123, 150

[56] References Cited

U.S. PATENT DOCUMENTS

| | | | |
|---|---|---|---|
| 2,709,674 | 5/1955 | Bergstrom | 196/147 |
| 2,813,352 | 11/1957 | Payne et al. | 34/10 |
| 2,834,429 | 5/1958 | Kinsella, Jr. et al. | 95/108 |
| 3,118,741 | 1/1964 | Faulk | 34/9 |
| 3,511,194 | 5/1970 | Stookey | 110/8 |
| 3,716,339 | 2/1973 | Shigaki et al. | 23/262 |
| 3,724,090 | 4/1973 | Smith, Jr. | 34/57 D |
| 3,812,794 | 5/1974 | Taylor | 110/8 R |
| 3,829,558 | 8/1974 | Banks et al. | 423/481 |
| 3,858,534 | 1/1975 | Berg | 110/8 R |
| 3,946,495 | 3/1976 | Osdor | 34/15 |
| 3,977,846 | 8/1976 | Russell et al. | 95/108 |
| 4,065,271 | 12/1977 | Weckesser et al. | 95/108 X |
| 4,133,273 | 1/1979 | Glennon | 110/346 |
| 4,140,066 | 2/1979 | Rathjen et al. | 110/235 |
| 4,230,053 | 10/1980 | Deardoff et al. | 110/346 |
| 4,231,764 | 11/1980 | Mattia | 95/109 |
| 4,245,570 | 1/1981 | Williams | 110/238 |
| 4,289,505 | 9/1981 | Hardison et al. | 55/59 |
| 4,295,281 | 10/1981 | Potter | 34/10 |
| 4,306,886 | 12/1981 | Clyde | 95/111 |
| 4,311,103 | 1/1982 | Hirose | 110/238 |
| 4,323,312 | 4/1982 | Glatt et al. | 366/102 |
| 4,331,088 | 5/1982 | Gold | 110/346 |
| 4,340,471 | 7/1982 | Jordan | 210/101 |
| 4,361,100 | 11/1982 | Hinger | 110/238 |
| 4,395,830 | 8/1983 | Lockwood | 34/10 |
| 4,402,274 | 9/1983 | Meenan et al. | 110/346 |
| 4,450,777 | 5/1984 | Wolfrum et al. | 110/342 |
| 4,463,691 | 8/1984 | Meenan et al. | 110/346 |
| 4,466,202 | 8/1984 | Merten | 34/27 |
| 4,685,220 | 8/1987 | Meenan et al. | 34/10 |
| 4,699,721 | 10/1987 | Meenan et al. | 210/771 |
| 4,778,606 | 10/1988 | Meenan et al. | 210/771 |
| 4,782,625 | 11/1988 | Gerken et al. | 47/1.42 |
| 4,793,937 | 12/1988 | Meenan et al. | 210/771 |
| 4,902,311 | 2/1990 | Dingfors et al. | 95/109 |
| 4,951,417 | 8/1990 | Gerken et al. | 47/1.42 |
| 5,103,578 | 4/1992 | Rickard | 34/406 X |
| 5,176,087 | 1/1993 | Noland et al. | 110/346 |
| 5,198,190 | 3/1993 | Philipp et al. | 420/582 |
| 5,304,234 | 4/1994 | Takatsuka et al. | 95/106 |
| 5,336,300 | 8/1994 | Yoshino et al. | 95/106 X |
| 5,364,447 | 11/1994 | Philipp et al. | 75/500 |
| 5,370,850 | 12/1994 | Thöne et al. | 95/108 X |
| 5,464,597 | 11/1995 | Tang | 95/108 X |
| 5,496,392 | 3/1996 | Sims et al. | 75/414 |
| 5,496,395 | 3/1996 | Yamazaki | 96/123 |
| 5,500,195 | 3/1996 | Garcia-Mallol | 95/108 X |
| 5,656,178 | 8/1997 | Marchesi et al. | 34/412 X |
| 5,676,738 | 10/1997 | Cioffi et al. | 95/109 |
| 5,725,635 | 3/1998 | Zubini et al. | 95/110 X |

FOREIGN PATENT DOCUMENTS 2014472  8/1979  United Kingdom .................... 95/108

OTHER PUBLICATIONS

Tenzler, Raymond, et al., "Characteristics of the Mobile Field Use System for the Detoxification/Incineration of Residuals from Oil and Hazardous Material Spill Clean–Up Operations", *Journal of Hazardous Materials*, 3 (1979) 61–75.

*Primary Examiner*—Robert Spitzer
*Attorney, Agent, or Firm*—Michael Best & Friedrich LLP

[57] ABSTRACT

A thermal desorption system for the treatment of contaminated solids.

35 Claims, 6 Drawing Sheets

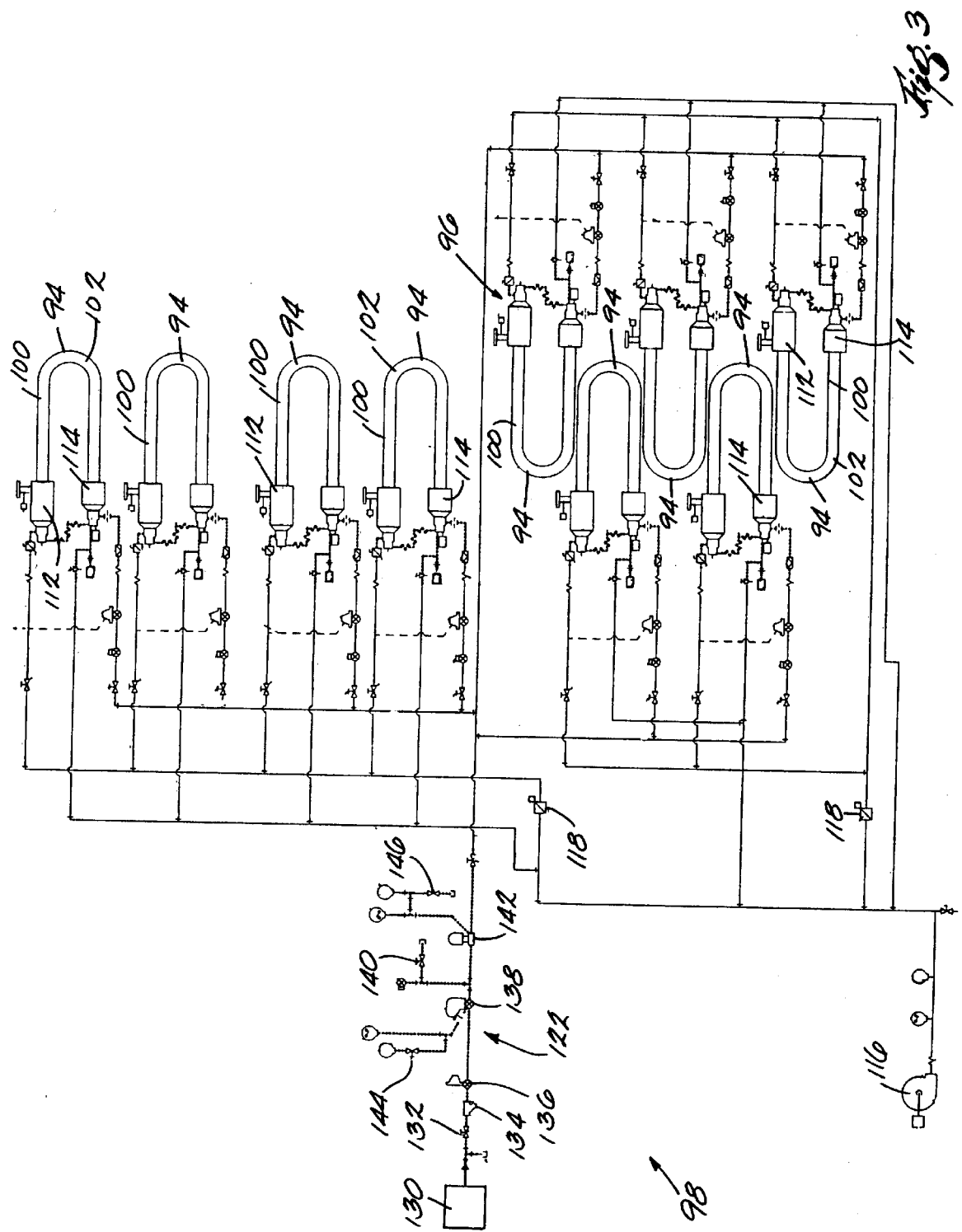

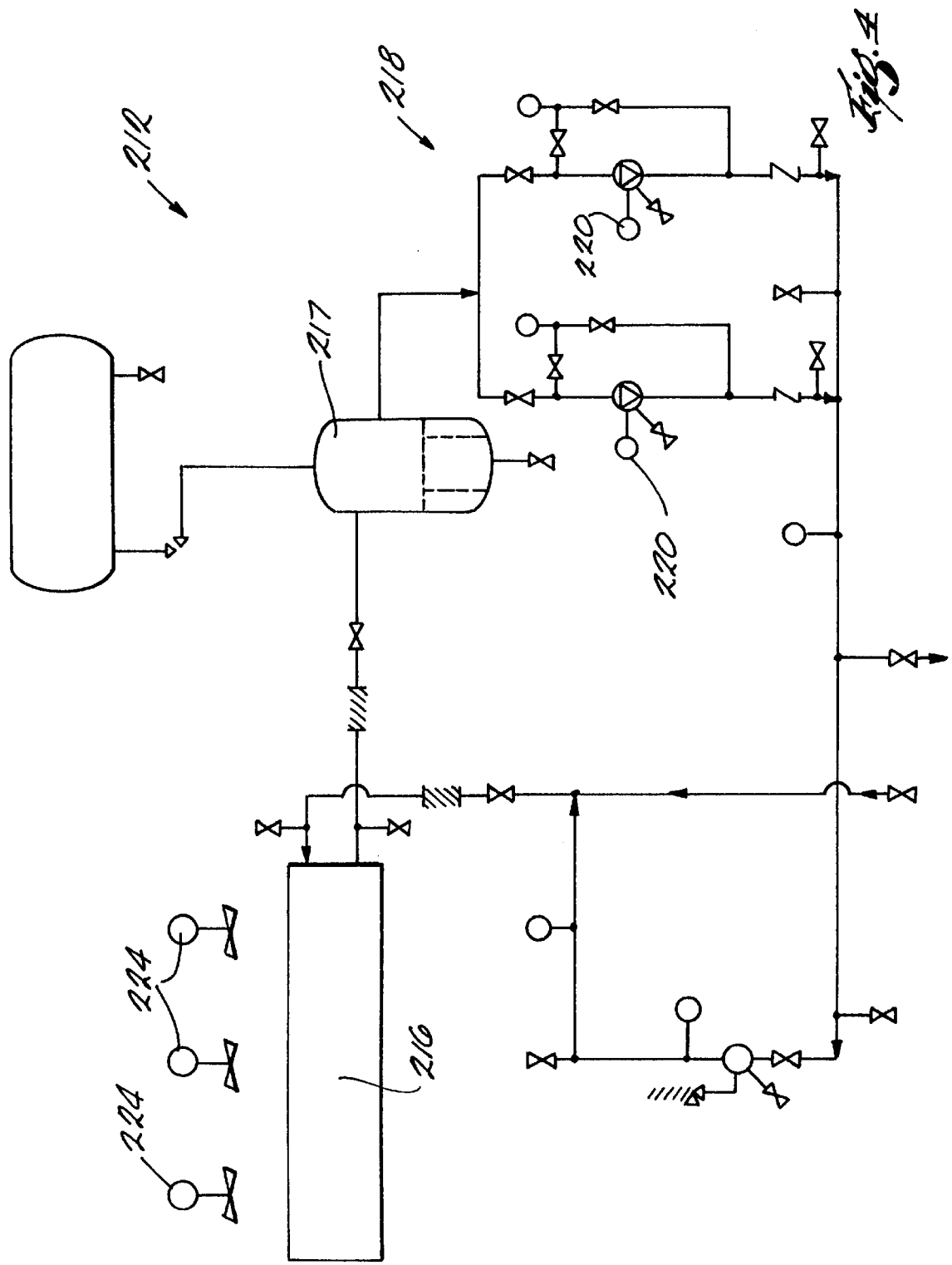

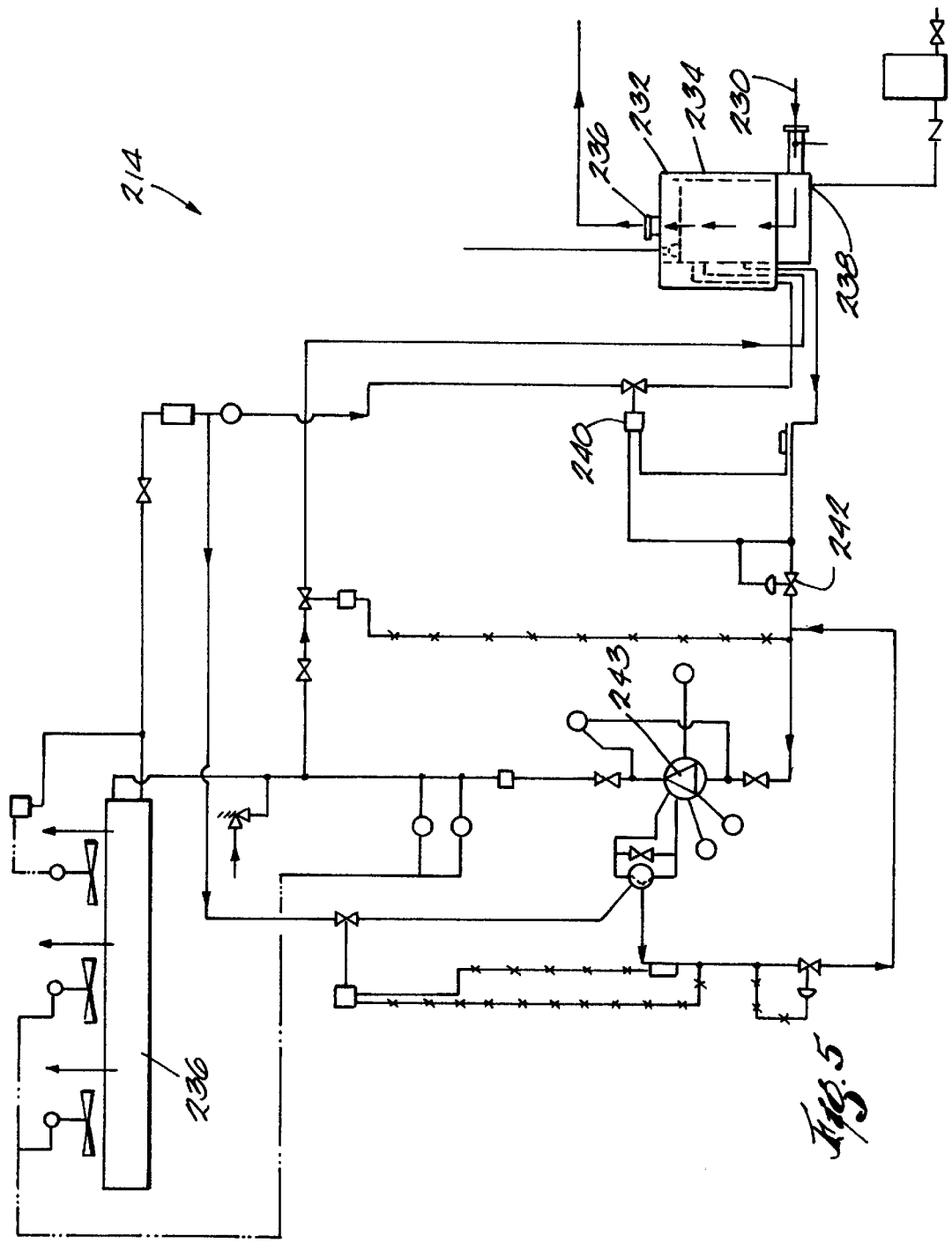

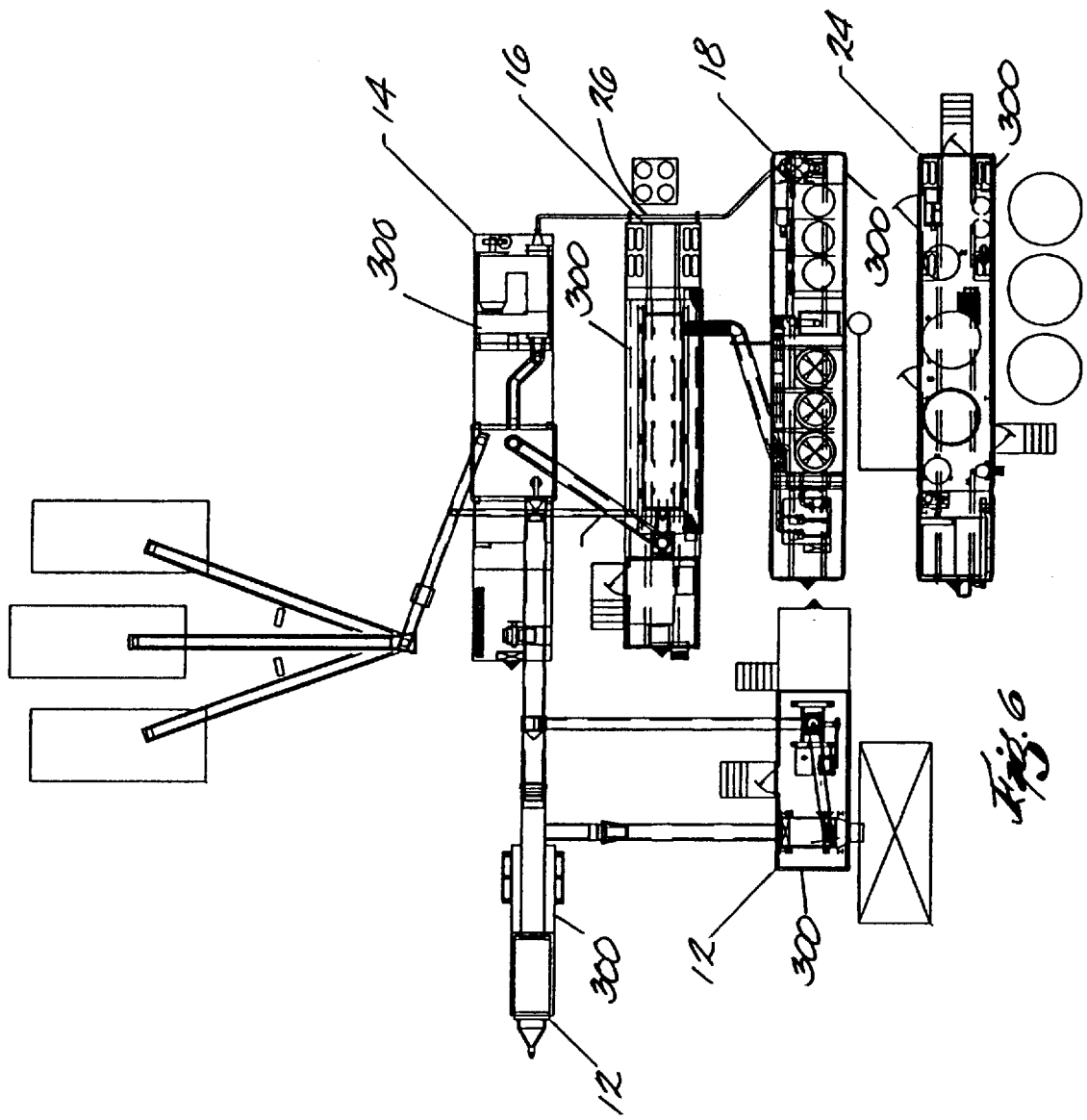

THERMAL DESORPTION SYSTEM

RELATED APPLICATIONS

This application claims priority from provisional application Ser. No. 60/014,362, filed Mar. 28, 1996.

FIELD OF THE INVENTION

The invention relates to a thermal desorption system, and more particularly, to a fluidized bed thermal desorption system for removing contaminants from solids.

BACKGROUND OF THE INVENTION

The land disposal restrictions effective for wastes have created a need for technologies that can meet the best demonstrated available technologies (BDAT) treatment standards. However, such technologies are in short supply.

For example, the natural gas industry has begun to remediate the numerous metering sites that have been contaminated with mercury from manometers installed along their pipelines. In May of 1993, the U.S. Environmental Protection Agency (EPA) regulations no longer allowed soils contaminated with mercury to be landfilled without meeting certain treatment standards. These regulations are known as the land disposal restrictions or land ban. The EPA land disposal restrictions were developed to prevent hazardous substances from being landfilled that were considered leachable and would present future environmental problems or for those compounds that could be recycled. Originally, the land ban for mercury-containing wastes was to go into effect in May of 1992. However, due to the lack of available technologies considered BDAT for mercury-contaminated waste, the effective date for meeting the treatment standard for mercury-containing wastes was extended until May of 1993.

The land ban treatment standards for mercury-containing waste (non-wastewater) apply to media that is characterized to meet the condition of a toxicity characteristic leaching procedure (TCLP) concentration of greater than 0.2 milligram per liter. If soil fails the TCLP criteria, the waste must be treated to meet the treatment standards.

Accordingly, there exists a need for a remediation technique that is useful in separating contaminants from solids.

SUMMARY OF THE INVENTION

The invention provides for a fluidized bed thermal desorption system which volatilizes a contaminant and thereafter the contaminant is separated from the resulting gas stream.

Preferably, the process of the present invention includes the following subsystems: material handling, calcine chamber, gas filtration, gas cooling, gas generation, fluid air, water treatment and process control.

It is an object of the present invention to provide a thermal desorption system that utilizes heating with an indirect heat source.

It is another object of the present invention to provide a thermal desorption system that utilizes indirect heating to minimize and/or eliminate discharges to the environment.

It is another object of the present invention to provide a thermal desorption system that exhibits efficient heat transfer into solids.

It is another object of the present invention to provide a thermal desorption system that operates in an inert gas environment.

It is another object of the present invention to provide a thermal desorption system that continuously processes solids.

It is another object of the present invention to provide a thermal desorption system that recycles process gas which reduces the need for air pollution control devices.

It is another object of the present invention to provide a thermal desorption system that can be implemented with mobile equipment.

Other features and advantages of the invention will become apparent to those of ordinary skill in the art upon review of the following detailed description, claims, and drawings.

BRIEF DESCRIPTION OF THE DRAWINGS

FIG. 3 is a schematic of the indirect heating system;

FIG. 4 is a schematic of the precooler;

FIG. 5 is a schematic of the condenser; and

FIG. 6 is a schematic of the thermal desorption system made mobile on trailers.

Figure 1:
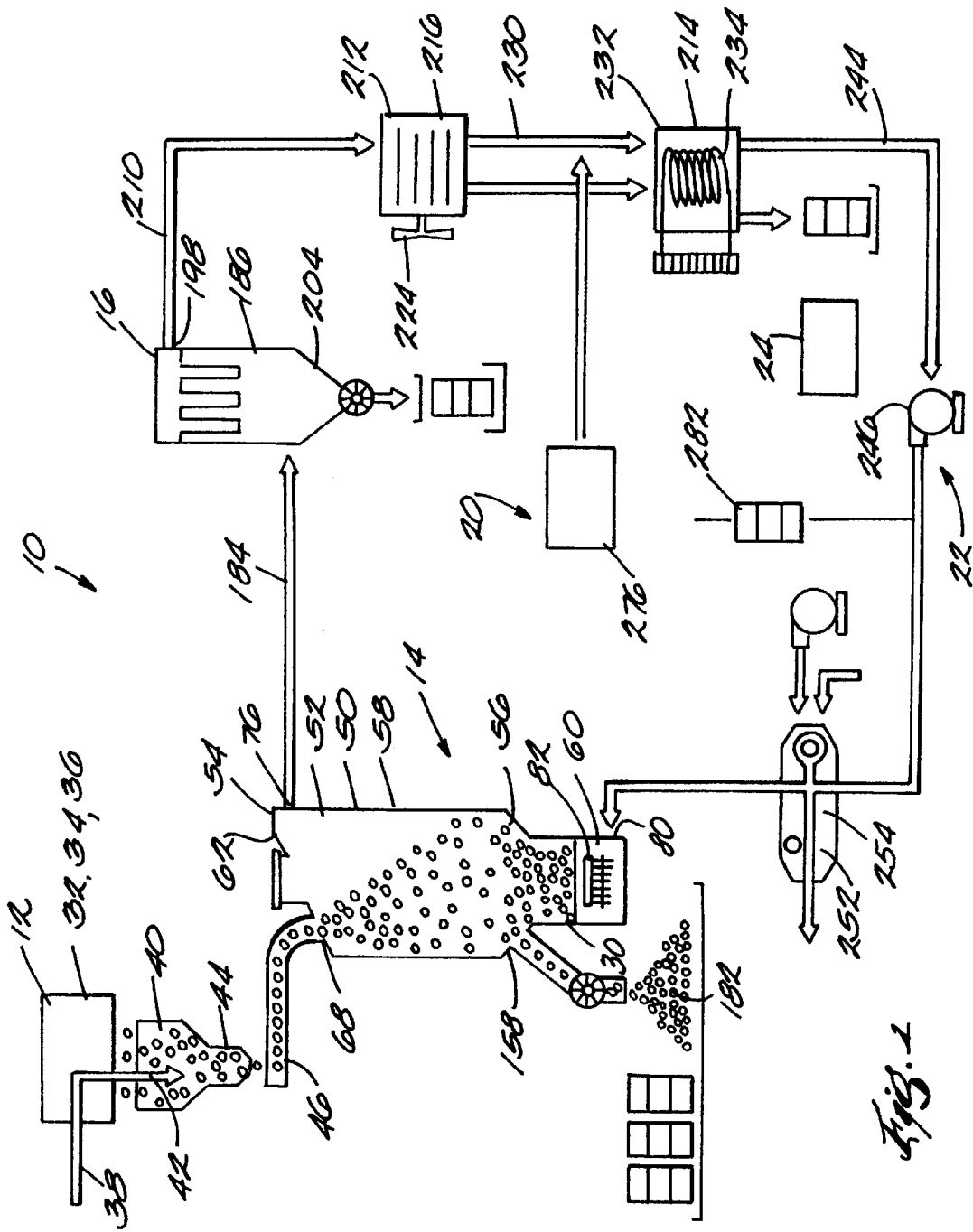
FIG. 1 is a schematic of a thermal desorption system embodying the invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Figure 2:
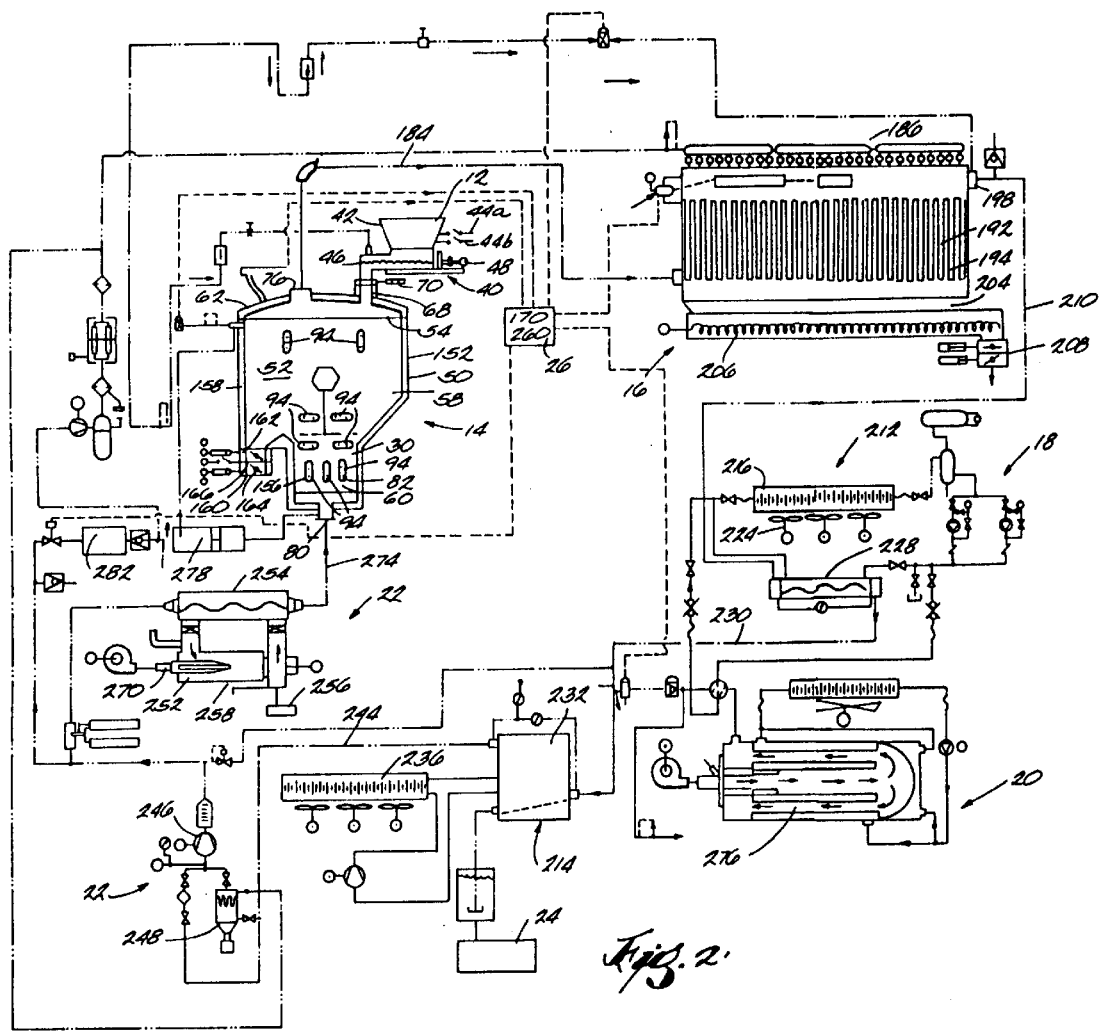
FIG. 2 is a schematic of the thermal desorption system.

Referring now to FIGS. 1 and 2, the thermal desorption system 10 of the present invention preferably includes a variety of subsystems. These subsystems may include material handling 12, calcine chamber 14, gas filtration 16, gas cooling 18, gas generation 20, fluid air 22, water treatment 24 and process control 26. The thermal desorption system 10 is intended to convert solids that are contaminated into solids with acceptable levels of those contaminates. The thermal desorption system 10 performs remediation in that it corrects a problem in the solids.

The thermal desorption system 10 of the present invention can be used to treat a wide variety of materials or solids and contaminates. Examples of solids that can be treated using the system include soil, clays, silts, sands, rocks, etc. Examples of contaminates that can be treated with this system are set forth below. The examples of treatable solids and contaminates set forth herein are not intended to be limiting.

The thermal desorption system 10 of the present invention includes the use of a fluidized bed 30. Due to the nature in which fluidized beds operate, particle sizing of the solids is important for proper operation. The basis of fluidizing a bed of solids is to temporarily suspend particles by air flow. The air flow through the bed must be at a rate at which the velocities between solids particles increase enough to push the particles upwardly as the air flows through the bed. As the particle size increases, so does the force required to suspend the particles. Further, the larger the particle size, the longer it takes to vaporize the contaminants.

The thermal desorption system 10 preferably includes the material handling subsystem 12 to produce a generally homogeneous particle size which can be feed into the fluidized bed 30. Referring to FIG. 1, the material handling subsystem 12 can include a shredder 32, a crusher 34, a vibrating screen 36, and conveyors 38 to appropriately size and transfer the particles. However, it should be noted that particle sizing can be accomplished in various ways using a wide variety of equipment. The goal of the material handling subsystem 12 is to generate generally homogeneously sized particles. Preferably, the solids are finely ground to a particle size in the range of 0.003" to 0.250", however, actual particle sizes will vary.

As best shown in FIG. 2, the material handling subsystem 12 also includes a feeder 40. The feeder 40 introduces the solids into the calcine chamber subsystem 14. The feeder 40 includes a hopper 42 such as a five (5) cubic foot bin that is fed by a belt. A low level and a high level solids sensor (not shown) respectively are mounted at the hopper 42. Beneath the lower opening of the hopper 42 is a screw auger 46. A variable speed motor 48, such as a permanent magnetic one-half horsepower motor, drives the screw auger 46. The screw auger 46 transports the solids to the calcine chamber subsystem 14. The feeder 40 delivers 80–550 cubic feet per hour of solids to the calcine chamber subsystem 14 for treatment.

The calcine chamber subsystem 14 is designed to process a variety of different solids with different particles sizes and distributions. The calcine chamber subsystem 14 is also designed to bring the solids up to a sufficiently high temperature at an adequate retention time so that the contaminates contained therein will vaporize.

To accomplish the above, the calcine chamber subsystem 14 includes a calcine chamber 50 having an interior 52. As best shown in FIG. 2, the calcine chamber 50 can be divided into four sections; a gas room section 54, a fluidized bed section 56, an intermediate heat zone section 58 and a gas inlet section 60. In total, the calcine chamber 50 has a shape that facilitates efficient treatment of the solids therein. The gas inlet section 60, the fluidized bed section 56 and the gas room section 54 are preferably rectangular and the intermediate heat zone 58 is preferably frustoconical, although other configurations can be utilized.

The calcine chamber 50 includes an arched cover 62 to reflect heat back into the interior 52 of the chamber, observation ports to view the interior 52 and access hatches to provide access to the interior 52 for cleaning, maintenance, and the like.

The gas room section 54 is in an upper portion of the calcine chamber 50. The gas room section 54 includes a material or solids inlet 68 in the arched cover 62 through which solids enters the interior 52 of the calcine chamber 50 from the screw auger 46. The solids inlet 68 includes an isolation valve 70 to prevent gas from exiting the calcine chamber 50. The isolation valve 70 is, for example, a valve with an 8" by 8" opening. The valve 70 is normally open and mounted to the top of the solids inlet 68. When feeding of solids to the calcine chamber 50 is interrupted, the valve 70 closes and isolates the gas room section 54 from the screw auger 46. This avoids overheating the screw auger 46 and avoids drying of the solids in the screw auger 46. Because the valve 70 is normally open, the valve 70 is continually subjected to approximately 1200° F. gases from the interior 52 of the calcine chamber 50 and accordingly, the valve 70 generally attains that same temperature in steady state. The valve 70 preferably has a pneumatic cylinder and a flapper plate which provides an air tight seal when closed.

The gas room section 54 also includes a gas outlet 76 through which gas and entrained particles exit the calcine chamber 50. The particular shape of the gas room section 54 reduces the velocity of the gases and dust therein to minimize dust loading downstream in the system 10.

In a lower portion of the calcine chamber 50 is the fluidized bed section 56. The fluidized bed section 56 is preferably entirely filled with solids. The fluidized bed section 56 is designed to contain the fluidized bed 30 of the material to be treated. The fluidized bed section 56 is adapted to contain varying amounts of solids at varying densities. For example, the fluidized bed section 56 can be designed to hold and process 6000 pounds of solids per hour at an average density of 75 lbs/ft$^3$ and at a temperature in the range of 600° to 1600° F., and preferably at 1200° F. The volume of solids is important in determining the treatment retention time in the calcine chamber 50. Adequate retention times are required to assure uniform heating and exposure for solids treatment.

The feed rate of the solids into the calcine chamber 50 can range from 6,000–10,000 lbs/hour with an average retention time in the calcine chamber 50 of 35–60 minutes. The feed rates and retention times can vary in that the feed rate is adjustable to maintain the temperature in the calcine chamber 50. The solids type, level of contaminants and moisture content will effect the retention time.

To fluidize the solids in fluidized bed section 56, preheated fluidizing gas is utilized. The preheated fluidizing gas passing through the solids causes the solids to move thus creating the fluidized bed 30. Preferably, the fluidizing gas is preheated to a temperature of approximately 1200° F. before entering the calcine chamber 50.

The intermediate heat zone section 58 is between the fluidized bed section 56 and the gas room section 54 in the interior 52 of the calcine chamber 50. Solids are thrown out of the fluidized bed 30 and into the intermediate heat zone section 58 by the fluidizing gas that migrates through the bed of solids.

The gas inlet section 60 is the bottom section of the calcine chamber 50 and is below the fluidized bed section 58. The fluidizing gas enters the calcine chamber 50 at the gas inlet section 60. Specifically, the fluidizing gas enters the gas inlet section 60 via a gas inlet 80. The gas inlet section 60 is a pressurized area, such as a sealed plenum, that distributes the fluidizing gas evenly to a stainless steel bed plate 82. The bed plate 82 separates the gas inlet section 60 from the fluidized bed 30 and is preferably fabricated of SS 310. The bed plate 82 has therethrough evenly spaced apertures. For example, the apertures can be 2⅜" in diameter. The apertures have fluidizing tubes welded thereto with each tube being, for example, 1.93" in inside diameter and fabricated of SS 310. Each tube has small orifice holes drilled around its circumference and preferably there are eight holes per tube. For example, the holes can be 0.219" in inside diameter. The holes in the tubes preferably point downwardly to prevent solids in the fluidized bed 30 from entering into the gas inlet section 60.

The fluidizing gas enters the calcine chamber 50 via the gas inlet 80, flows into the gas inlet section 60, through the bed plate apertures and holes in the tubes then into the fluidized bed 30. The fluidizing gas traveling downwardly bounces off the bed plate due to the downwardly facing holes in the tubes and then rises through the solids in the bed 30. Preferably, the preheated gas enters the calcine chamber 50 at an average velocity of approximately 160 feet per second. The fluidizing gas flow rate is adjustable to match the type of solids being processed by the system 10.

Temperatures are maintained in the fluidized bed section 56, in the intermediate heat zone section 58 and in the gas room section 54 using an indirect heating system. The indirect heating system provides the required thermal energy for the interior 52 of the calcine chamber 50 to heat the solids and vaporize the contaminants. As best shown in FIGS. 2 and 3, the indirect heating system preferably includes a plurality of indirectly fired natural gas U-tube radiant heaters 94 located throughout the calcine chamber 50, a burner system 96 and blower/fuel train system 98. The U-tube heaters 94 are preferably constructed of high temperature nickel-chrome base alloy. The alloy is centrifugally cast into 6" outside diameter tubes 100 with a wall thickness of 3/16". The tubes 100 are welded to a short radius 180° elbow 102. The welds are gas tight and pressure checked for leakage. The tube weldments are preferably welded to mounting flanges and a refractory plug. The flanges are used in mounting the U-tube heaters 94 in the calcine chamber 50. The refractory plug is used to lower the heat losses through the shell of the calcine chamber 50.

Preferably, there are nine U-tube heaters 94 in the calcine chamber 50. Five of the U-tube heaters 94 are installed in the fluidized bed section 56 with each heater 94 having a gross output of 600,000 BTU/HR. All five U-tube heaters 94 in the fluidized bed section 56 are preferably controlled by a single air control valve which is set to control on a high/low fire control scheme. The U-tube heaters 94 will modulate between low fire and high fire in order to control temperature in the calcine chamber 50.

Two U-tube heaters 94 are located in the intermediate heat zone section 58 and extend over the top surface of the fluidized bed 30. Each U-tube heater 94 has a gross output of 410,000 BTU/HR.

Two U-tube heaters 94 are located in the gas room section 54, with each heater 94 having a gross output of 410,000 BTU/HR. The two U-tube heaters 94 in the intermediate heat zone section 58 and the two U-tube heaters 94 in the gas room section 54 are preferably controlled by a single air control valve which is set to control on a high/low fire control scheme. The U-tube heaters 94 will cycle from low fire to high fire in order to control the temperature in the calcine chamber 50.

With reference to FIG. 3, the burner system 96 of the indirect heating system includes a recuperator 112 and a burner 114 for each U-tube heater 94. Each recuperator 112 is preferably a gas-to-gas heat exchanger which preheats the combustion air in the U-tube heater 94. Preheated combustion air increases the efficiency of the combustion process. Air is preheated by using the flue gas coming out of the U-tube heaters 94. Each recuperator 112 is positioned in one end of the U-tube heater 94 and bolted in place. Each burner 114 is preferably a nozzle mix direct spark ignition type burner with UV flame detectors. Each burner 114 is positioned in the other end of a U-tube heater 94 and bolted in place.

The blower/fuel train system 98 of the indirect heating system includes a blower 116 and automatic air butterfly valves 118 preferably mounted in a piping header. The valves 118 are controlled by modulating control motors which maintain the desired temperature in the calcine chamber 50.

The blower/fuel train system 98 further includes a fuel train which includes a series of regulator valves, pressure switches and a block and vent gas train. Natural gas comes from a main supply 130 through a shut-off valve 132 and strainer 134, into a pressure reducing regulator 136, then passes into a first valve 138 of the gas train. The first valve 138 is a normally closed manual reset shut-off valve which must be cocked each time the burner system 96 is to be started after a purge cycle. The first valve 138 is held open electrically after the arm is cocked. A second valve 140 is included and is a normally open vent valve. The second valve 140 is electrically held closed when the first valve 138 is cocked or whenever the first valve 138 is closed. A third valve 142 is included and is preferably a blocking valve. The third valve 142 is electrically opened when the first valve 138 is cocked. A low gas pressure switch 144 is preferably placed in front of the first valve 138 to verify enough gas pressure is present. A high gas pressure switch 146 is preferably placed in back of the third valve 142 to verify the correct pressure. When the switch 146 senses an unusual condition, the first valve 138 is closed.

The calcine chamber 50 preferably includes a high temperature alarm and a lower temperature alarm located in each heater 94. When a predetermined temperature is reached in the gas room section 54, the one or more of the U-tube heaters 94 will be turned off. When the low exhaust temperature alarm sounds for a particular U-tube heater 94, this indicates a possible hole in the heater 94. When the high exhaust temperature alarm sounds for a particular U-tube heater 94, this indicates over heating.

The mode of heat transfer in the calcine chamber 50 is complex and can best be described as a combination of conduction, convection and radiation.

Specifically, in the fluidized bed 30, as the preheated fluidizing gas surrounds the solids, the solids will be heated via convection heat transfer. As the solids move around the U-tube heaters 94, the solids are heated by radiant heat transfer. As the particles of solids contact each other and contact the U-tube heaters 94, heat is transferred by conduction.

In operation and with reference to FIGS. 1 and 2, the solids enter the calcine chamber 50 through the solids inlet 68, drop through the gas room section 54 and enter the fluidized bed 30 where the solids are evenly distributed across the bed plate 82. The preheated fluidized gas and the indirect heat from the U-tube heaters 94 creates a circulation of the solids in the fluidized bed 30. The fluidized bed 30 resembles a boiling mass of solids and hot gas. It is in this boiling mass of solids that efficient heat transfer occurs resulting in vaporization of the contaminants. This boiling mass creates an environment that is not conducive to slagging.

Due to the fluidized bed 30, the intermediate heat zone section 58 of the calcine chamber 50 contains solids that fly out of the fluidized bed 30, strike the two U-tube heaters 94 then fall back into the fluidized bed 30. Solids are found in the intermediate heat zone 58 section because the particles are thrown out of the fluidized bed 30 by gas bubbles as the bubbles migrate upwardly through the fluidized bed 30. The U-tube heaters 94 in the intermediate heat zone section 58 contribute heat to the calcine chamber 50 by radiant heating and by conductive heating of the solids that hit the U-tube heaters 94.

The gas room section 54 of the calcine chamber 50 has the fewest solids flying through it. Particles such as dust can be found moving slowly within the gas stream. The dust and any larger solids, if they contain the contaminates, will release the contaminants in the gas room section 54 due to the heat radiating from the two U-tube heaters 94. The U-tube heaters 94 maintain and slightly elevate the temperature of the gas stream to aid vaporization of the contaminants contained in the dust and particles.

Referring to FIG. 2, the calcine chamber 50 is constructed of an outer steel shell 152. For example, the calcine chamber 50 has dimensions of 9'3" in length, 8'7" in width and 11'10" in height. An abrasion resistant refractory preferably lines the interior 52 of the calcine chamber 50 to provide resistance against the abrasive action of the solids impacting the walls of the calcine chamber 50. For example, three different types of refractory are used. An insulating castable refractory is used for the floor of the calcine chamber 50 up to the bed plate 82, such as insulating fireclay castable refractory. Gunned refractory is used from the bed plate 82 to and including the cover 62, such as fireclay gunned refractory. Between the steel shell 152 and the gunned refractory is a board insulation such as board insulation. Ceramic fiber insulating modules, such as ceramic fiber insulating modules, are used on any access hatches because of its light weight. All of the refractory is secured to the steel shell 152 using stainless steel anchors. Further, the calcine chamber 50 employs gaskets where necessary.

Before processing can begin, the calcine chamber 50 needs to be preheated to approximately 1200° F. The calcine chamber refractory should not be heated more than 100° F. per hour at commissioning. Each start-up thereafter can be ramped up at a maximum of 200° F. per hour.

With reference to FIG. 2, the processed solids exit the calcine chamber 50 via a solids outlet 158 located at the lower portion of the calcine chamber 50. The outlet 158 is controlled by a double dump airlock valve 160. The valve 160 preferably contains two 8" valves 162 and 164 with a Dutchman or spacer piece 166 between them. The valves 162 and 164 contain an 8" by 8" through opening to allow solids to pass. The valves 162 and 164 act as an airlock. Because the valves 162 and 164 are in constant physical contact with the approximately 1200° F. solids, the valves 162 and 164 reach approximately the same temperature in steady state operation. Preferably, the valves 162 and 164 are rated for continuous cyclic operation at 1800° F. The valves 162 and 164 preferably include pneumatic cylinders which act to open and close flapper plates. Bearings can be used and located exterior to the valves 162 and 164 for cooling purposes.

The valves 162 and 164 can be operated in two modes of operation. The normal mode of operation is for a solids level sensor to provide a signal to a programmable logic controller (PLC) 170 to cycle the valves 162 and 164 at a frequency which is based on actual solids flow into the valves 162 and 164. Each valve 162 and 164 contains a coupling welded to the wall of the outlet. A solids level sensor is mounted to the coupling. For example, the sensor is a soil level sensor. The sensor provides the PLC 170 with an indication of the solids level at the solids outlet. The sensor includes a slow torque slow speed synchronous electric motor which rotates a paddle wheel. When the solids level is below the paddle wheel, the motor rotates freely. The sensor contains an internal circuit which senses this motion and provides a signal to a control system. When the solids level is above a predetermined level, the paddle wheel strikes the solids and stops the wheel from rotating. The PLC 170 then shuts the top valve 162 and opens the bottom valve 164 so that the solids exit the calcine chamber 50. The paddle wheel then begins to rotate freely again. In the second mode of operation, the valves 162 and 164 are operated to cycle every twenty seconds.

After exiting the calcine chamber 50 via the solids outlet 158, the solids can be transported along a cooling conveyor and are thereafter accumulated in a containment area 182.

As shown in FIGS. 1 and 2, a gas stream exits the gas room section 54 of the calcine chamber 50 through the gas outlet 76 and is transported along an exhaust gas duct 184 to the gas filtration subsystem 16. The gas stream termed process gas is entrained with dust and leaves the gas room section 54 at a temperature of approximately 1250° F. The process gas remains in the system 10 in a closed loop in that the process gas is treated in various steps then used as the fluidizing gas in the calcine chamber 50 to repeat the cycle. Process gas only exits the closed loop if pressure needs to be reduced in the system 10. Recycling of the process gas eliminates the need for extensive pollution control devices.

The exiting process gas stream contains dust or fines of the solids that need to be removed from the process gas. The process gas stream exiting the gas room section 54 must be maintained at a temperature above the condensation point of the contaminates during the particulate removal. Accordingly, the gas filtration subsystem 16 includes a high temperature baghouse 186 to remove particulate matter from the process gas stream. Preferably, the baghouse 186 is operated with a process gas inlet temperature of approximately the range of 1100°–1200° F.

As best shown in FIG. 2, the baghouse 186 preferably is a pulse jet ceramic filter dust collector. As the particulate laden process gas stream enters the baghouse 186, a fabric filter preferably reduces the velocity of the gas/particulate allowing the larger particulates to fall into a hopper. The finer particulates are borne into a bag area 192 and pass through rows of bags 194 depositing the particulates on the outside of the bags 194. The filtered process gas stream continues up the inside of the bags 194, into a clean air plenum and then out of the baghouse 186 via an outlet 198.

Accumulated particulates on the exterior of the bags 194 are periodically removed by directing a short pulse of compressed air down the inside of each bag 194. An aero-dynamically designed venturi at the top of each bag 194 causes the pulse of compressed air to induce a flow of clean air into each bag 194. A shock wave is set up that travels down each bag 194 and hits a solids plate at the bottom of the baghouse 186. The shock wave momentarily pressurized each bag 194, stops the flow of air into it and flexes the fabric. The particulates fall off and drop into a hopper 204.

This instantaneous cleaning action proceeds row by row for each bag 194 while the flow of particulateladen air into the filter continues uninterrupted. Each row of bags 194 being cleaned is off stream for approximately 1/20th of a second or less. Accordingly, the baghouse 186 is in virtually continuous operation.

Particulates removed from the bags 194 drop from the hopper 204 into a transport/screw conveyor 206. A double dump valve 208 is located at the discharge end of the conveyor 206. The valve 208 sequences open/close to form an airlock while removing the particulates from the baghouse 186.

The process gas stream exiting the baghouse 186 at the outlet 198 is next treated to remove the contaminate. In the preferred embodiment, the process gas stream is conveyed along an exhaust gas duct 210 to the gas cooling subsystem 18. The gas cooling subsystem 18 contains a precooler 212 and a condenser 214. The precooler 212 and the condenser 214 are designed for easy cleaning of any particulate matter that may pass through the baghouse 186 and enter into the gas cooling subsystem 18.

As best shown in FIGS. 2 and 4, to remove water and contaminate from the process gas stream, the process gas is reduced in temperature using the precooler 212. The precooler 212 is preferably a closed, pressure tight system offering the advantage of low accumulation of oxygen and the elimination of impurities that would reduce system life. The process gas flows through the precooler 212 and is cooled by a water/glycol mixture.

Specifically, the precooler 212 is preferably a shell and tube heat exchanger that transfers heat in the process gas to a flow of the cool glycol/water reducing the process gas to a fully saturated temperature equilibrium. Preferably, the gas cooling subsystem 18 is designed for a freezing climate by circulating an aqueous solution of 30% by volume minimum inhibited glycol in water. The heat transferred from the process gas to the water/glycol solution is circulated through a radiator 216 where the heat taken on is transferred to the surrounding atmosphere. The cooled water/glycol solution preferably circulates through an air separator 217 which includes an internal strainer and to a pump section 218. Three fans 224 are utilized to facilitate heat transfer from the process gas to the glycol/water solution.

The pump section 218 preferably includes at least one motor driven pump 220 which increases pressure to circulate the water/glycol solution. The pumping requirements are preferably divided between two pumps to allow partial performance should one pump fail to operate. The water/glycol solution flows from each pump discharge to a heat exchanger 228 where the solution is heated again completing a closed loop.

For example, the precooler 212 operates with approximately 170 gallons of water/glycol solution volume which is preferably 60 gallons of inhibited ethylene glycol at 35% by volume, a circulation rate of 122 GPM and a pump pressure of 22 PSIG. The cooled process gas stream exits the heat exchanger 228 via a duct 230. The process gas stream exits the precooler 212 at approximately 130° F.

The process gas stream is next refrigerated to condense the water and contaminant contained therein through use of the condenser 214 as shown in FIGS. 2 and 5. The condenser 214 preferably includes a refrigerated gas dryer 232 in a gas tight insulated steel chamber designed to cool the process gas stream from 130° F. to 40° F. The process gas stream travels along the duct 230 and enters the drier 232. Inside the drier 232, the process gas flows over a finned direct expansion cooling coil 234 cooling the process gas. The cooled process gas is then discharged at the top 237 of the drier 232. Condensed water and contaminant on the cold coil falls to the bottom 238 of the drier 232 where it is drained off, collected and optionally recovered.

More specifically, the drier 232 circulates a captive volume of refrigerant in a closed circuit, such as HCFC-22 refrigerant. The liquid portion of the refrigerant passes from the drier 232 where the refrigerant is changed from hot high pressure vapor to a warm high pressure liquid and then through a liquid line dehydrator 236. An expansion valve 240 preferably meters the proper amount of refrigerant into the cooling coil of the drier 232 to enable the cooling coil to operate at maximum efficiency and yet vaporize all the refrigerant. As the refrigerant flows through the expansion valve, it changes from a warm high pressure liquid to a cold low pressure liquid and vapor.

From the expansion valve, the refrigerant flows into and through the cooling coil 234. The coil 234 cools the process gas which is in contact with the finned tube surfaces of the cooling coil thereby limiting its ability to retain condensable vapors which are condensed out onto the coil fins, dripping down into the bottom 238 of the drier 232. The vapor portion of the refrigerant passes from the coil 234 through an evaporator pressure regulating valve 242 which maintains cooling coil pressure and prevents the coil temperature from dropping below freezing.

The cooled refrigerant vapor then flows from the evaporator regulating valve 242 to a refrigerant compressor 243 where the vapor is compressed into a high pressure hot gas. The high pressure hot gas then passes into the drier 232 to be cooled and condensed into a warm high pressure liquid refrigerant ready to repeat the cycle. The liquid condensing pressure is maintained by controlling the quantity of air passing through the condenser 214. To provide for continuous operation with fluctuating load, the condenser 214 is preferably provided with a hot gas by-pass balance loading system.

Referring to FIG. 2, the cooled process gas stream exits the condenser 214 along a duct 244. The process gas exits the condenser 214 at approximately 40° F. The duct 244 is in communication with the fluid air subsystem 22. This subsystem 22 pressurizes, preheats and recycles the cooled process gas back to the calcine chamber 50 to be used as the source of fluidizing gas. As shown in FIG. 2, this subsystem 22 includes a blower 246 which is designed to generate a small vacuum through all the subsystems and designed to enable the correct pressure and flow of fluidizing gas into the gas inlet section 60 of the calcine chamber 50. The blower 246 operates, for example, at 2286 RPM with a flow rate of approximately 500 SCFM. The fluid air subsystem 22 also includes a filter 248 which is, for example, a cartridge dust collector and a pleated paper canister. The filter 248 filters the process gas before it enters the calcine chamber 50.

The fluid air subsystem 22 further includes a preheater 252. The preheater 252 includes a heat exchanger 254, a recirculation fan 256 and a combustion chamber 258. The heat exchanger 254 is preferably a gas-to-gas counter flow heat exchanger constructed of 304 stainless steel tube bundle with reinforced expansion joint, primary duct with tuberlator baffles and an external shell lined with insulation.

The recirculation fan 256 is preferably a high temperature radial blade fan with operating temperatures of up to approximately 1450° F. The fan 256 circulates the process gas through the heat exchanger 254 with a net heat transfer of 700,000 BTU/HR. The shaft of the fan 256 preferably has an air dam and heat slinger for cooling. Pedestal mounted pillow block bearings can be added for cooling. The housing of the fan 256 preferably incorporates a double wall construction with added insulation. The inner housing of the fan 256 is isolated from the outer housing to prevent hot spots and to allow for duct expansion. Preferably, the fan 256 is rated at, for example, 3,500 CFM 18" W.C. and 2390 RPM.

The combustion chamber 258 is preferably constructed with ¼" plate shell and angle ribbing. The combustion chamber 258 is lined with 6" of fiber ceramic insulation. A 10" square refractory plug is preferably placed in front of the recirculation fan inlet. The plug is used to divert the products of combustion from direct impingement with the fan 256. The heat source of the preheater 252 is a single nozzle mix natural gas burner 270. Preferably, the burner 270 is a nozzle mix, interrupted integral pilot, 40:1 turn down type burner.

To preheat the fluidizing gas, the process gas is passed through the heat exchanger 254. The products of combustion of the burner 270 are circulated within the heat exchanger 254 through use of the fan 256. The fan 256 pushes the products of combustion through the primary side of the heat exchanger 254 and back into the combustion chamber 258. The "cold" products leaving the heat exchanger 254 mix with the hot products of combustion in the combustion chamber 258 and start the process over again. Positive pressure is maintained in the combustion chamber 256 by the use of an exhaust flue damper located down stream of the heat exchanger 254. The preheated fluidizing gas travels along a conduit 274 before entering the gas inlet section 60 through the inlet 80.

Continuing to refer to FIG. 2, the gas generator subsystem 20 of the system 10 includes an inert gas generator 276 which supplies additional gas to the closed loop. The inert gas generator 276 maintains a very low oxygen level in the closed loop to prevent combustion in the process gas stream. The inert gas generator 276 is designed to maintain the oxygen concentration of the system 10 below 7%, and preferably between 1.5% and 5%. Gas samples are continuously collected from the calcine chamber 50 and analyzed by a gas analyzer 278. The gas analyzer 278 is connected to the PLC 170 which controls the amount of additional gas that is delivered into the closed loop. The PLC 170 is suitably programmed to maintain an oxygen-deficient atmosphere in the calcine chamber 50 while minimizing and balancing the amount of process gas discharged to the atmosphere. Preferably, the capacity of the inert gas generator 276 is, for example, 100 SCFM. Preferably, the inert gas generator 276 is protected against over pressure with a check valve.

The gas generation subsystem 20 is designed to maintain a negative pressure within the calcine chamber 50. The gas generation subsystem 20 maintains the calcine chamber 50 at a pressure slightly below atmospheric pressure to maintain the closed loop and prevent leakage to the atmosphere.

More specifically, the blower 246 generates the necessary system gas pressure and flow. The blower 246 discharge generates the positive pressure necessary for fluidizing the bed 30. The blower 246 pulls the process gas through the system 10, creating the closed loop partially with negative pressure. The system 10 is balanced in a way that the pressure in the gas room section 54 is held at a slight negative pressure and the blower 246 outlet pressure equals the pressure drop at the preheater 252 and the fluidized bed section 56. This slight negative pressure, downstream of the calcine chamber 50, assures that any potential leakages in the process stream would suck ambient air into the system 10 versus allowing gas to leave the closed loop. Infiltration of ambient air causes excess gas volume in the closed loop. Subsequently, process gas can be released from the closed loop through a charcoal filter 282 to maintain proper pressure balance. The filter 282 is preferably located after the gas cooling subsystem 18 to assure final filtration prior to release to the atmosphere.

The thermal desorption system 10 of the present invention can optionally include a water treatment subsystem 24. If solids with a moisture content of 20% on a dry-weight basis and generally about 1,000 tons are to be processed, approximately 40,000 gallons of water will be collected as condensate. Instead of treating this water through a carbon system, the water treatment subsystem 24 is designed to remove and recover the contaminant from the condensate.

Preferably, the water treatment subsystem 24 includes a rough separation stage to separate the contaminate from the water via gravity, a chemical separation stage to further separate the contaminate from the water using chemical binders, and a filter separation stage to further separate the contaminate from the water using a resin-type filter.

With respect to the process control subsystem 26 of the present invention, a computerized system control and data acquisition system (SCADA) 260 is used to operate the system 10, monitor the system components, and record various system operating parameters. The SCADA allows for easy reporting and charting of temperatures, pressures, flows, and concentrations of contaminants.

Preferably, the processing capacity of the thermal desorption system 10 is three to five tons of solids per hour. The processing rate is a function of the moisture content of the solids, the type of solids, and the contaminant in the solids. The efficiency of the system 10 in removing contaminants varies, however, some contaminates can be removed to approximately less than one part per million.

The system 10 can be made mobile as is shown in FIG. 6. In a mobilized configuration, the process equipment is housed on trailers 300. Preferably, two trailers contain the material-handling subsystem 12, one trailer contains the water treatment subsystem 24, one trailer contains the calcine chamber subsystem 14, one trailer contains the gas filtration subsystem 16 and the process control subsystem 26, and one trailer contains the gas cooling subsystem 18.

The system 10 of the present invention is useful in treating many types of contaminates in many types of solids. Any contaminant with a boiling point of approximately less than the operating temperature of the system 10 can be treated and this temperature range includes many compounds. The table set forth below, which is not intended to be limiting but only exemplary, lists common contaminants and their boiling points.

| CONTAMINANT | BOILING POINT (°F.) |
| --- | --- |
| Toluene | 231 |
| Ethylbenzene | 277 |
| Xylene | 320 |
| Benzo(a)pyrene | 594 |
| Chrysene | 838 |
| Mercury | 674 |
| Arsenic | 1,135 |
| Cadmium | 1,413 |
| Zinc | 1,665 |
| Barium | 2,979 |
| Lead | 3,191 |
| Chromium | 3,992 |
| Iron | 5,432 |
| Naphthalene | 424 |
| Fluoranthene | 482 |
| Acenaphthene | 532 |
| Fluorene | 563 |
| Anthracene | 644 |
| Pyrene | 759 |
| Phenanthrene | 644 |
| Aroclor-1248 | 707 |
| Aroclor-1254 | 734 |
| Aroclor-1260 | 788 |
| Aroclor-1262 | 800 |
| Trichloroethane | 167 |
| Trichlorethylene | 188 |
| Perchloroethylene | 250 |
| Tetrachloroethane | 296 |

We claim:

1. A process for removing a contaminant from a material comprising the steps:

providing a heated chamber with a substantially inert atmosphere;

maintaining the chamber at pressure below atmospheric pressure;

fluidizing the material in the chamber with a fluidizing gas to volatilize the contaminant from the material thereby creating a process gas stream containing the volatilized contaminant;

removing the volatilized material from the chamber;

removing the process gas stream from the chamber;

removing solids that are entrained in the process gas stream at a temperature above the condensation point of the contaminate;

separating the contaminant from the process gas stream; and utilizing a portion of the process gas as the fluidizing gas.

2. A process for removing a contaminant from a material as set forth in claim 1 wherein the providing step includes heating the chamber with an indirect heat source.

3. A process for removing a contaminant from a material as set forth in claim 2 wherein the indirect source includes radiant heaters.

4. A process for removing a contaminant from a material as set forth in claim 1 wherein said heated chamber is at a temperature of between 600° and 1600° F.

5. A process for removing a contaminant from a material as set forth in claim 1 wherein said substantially inert atmosphere has an oxygen concentration of less than seven percent.

6. A process for removing a contaminant from a material as set forth in claim 1 wherein a negative pressure is maintained in the chamber.

7. A process for removing a contaminant from a material as set forth in claim 1 wherein the maintaining step includes the use of a blower.

8. A process for removing a contaminant from a material as set forth in claim 1 wherein in the providing step, the chamber is a calcine chamber.

9. A process for removing a contaminant from a material as set forth in claim 1 wherein the step of removing solids that are entrained in the process gas stream includes the use of a baghouse.

10. A process for removing a contaminant from a material as set forth in claim 9 wherein the temperature in said baghouse is in the range of 500°–1400° F.

11. A process for removing a contaminant from a material as set forth in claim 1 wherein the separating step separates the contaminant from the process gas stream by condensation.

12. A process for removing a contaminant from a material as set forth in claim 1 wherein said fluidizing gas is heated to fluidize the material.

13. A process for removing a contaminant from a material as set forth in claim 12 wherein said fluidizing gas is heated to substantially the same temperature as the temperature of the chamber.

14. A process for removing a contaminant from a material as set forth in claim 1 and further including the steps of generating generally homogeneously sized particles of the material and transferring the particles of the material to the chamber.

15. A process for removing a contaminant from a material comprising the steps:

providing a chamber with a substantially inert atmosphere at a pressure below atmospheric pressure;

fluidizing the material in the chamber to volatilize the contaminant from the material;

removing chamber gas containing volatilized contaminant from the chamber; and separating the contaminant from the chamber gas.

16. A process for removing a contaminant from a material as set forth in claim 15 wherein the providing steps includes heating the chamber.

17. A process for removing a contaminant from a material as set forth in claim 16 wherein the chamber heated with an indirect heat source.

18. A process for removing a contaminant from a material as set forth in claim 17 wherein the indirect heat source includes radiant heaters.

19. A process for removing a contaminant from a material as set forth in claim 15 wherein said inert atmosphere has an oxygen concentration of less than seven percent.

20. A process for removing a contaminant from a material as set forth in claim 15 wherein the fluidizing step includes the use of a fluidizing gas.

21. A process for removing a contaminant from a material as set forth in claim 20 wherein the fluidizing gas includes a portion of said chamber gas.

22. A process for removing a contaminant from a material as set forth in claim 19 wherein the fluidizing gas is heated before fluidizing the material.

23. A process for removing a contaminant from a material as set forth in claim 15 wherein the separating step separates the contaminant from the chamber gas by condensation.

24. A process for removing a contaminant from a material as set forth in claim 15 and further including the step of removing solids that are entrained in the chamber gas.

25. A process for removing a contaminant from a material as set forth in claim 24 wherein the step of removing solids that are entrained in the chamber gas includes maintaining the chamber gas at a temperature above the condensation point of the contaminates.

26. A process for removing a contaminant from a material as set forth in claim 24 wherein the step of removing solids that are entrained in the chamber gas uses a baghouse.

27. A process for removing a contaminant from a material as set forth in claim 26 wherein operates at a temperature in the range of 600°–1600° F.

28. A process for removing a contaminant from a material as set forth in claim 15 and further including the steps of generating generally homogeneously sized particles of the material and transferring the particles of the material into the chamber.

29. A process for removing a contaminant from a material as set forth in claim 28 and further including the step of controlling the transfer of the particles of the material into the chamber with a valve.

30. A mobile thermal desorption system for removing a contaminant from a material, said system comprising:

a fluidizing chamber adapted to contain a fluidized bed of material, said chamber having a material inlet, a material outlet, a gas inlet and a gas outlet;

a particulate separator in communication with said gas outlet of said chamber, said separator having a solids outlet and a gas outlet;

a condenser in communication with said gas outlet of said separator, said condenser having a contaminant outlet and a gas outlet; and a preheater in communication with said gas outlet of said condenser, said preheater in communication with said gas inlet of said chamber.

31. The mobile thermal desorption system as set forth in claim 30 and further including an inert gas generator in communication with said gas inlet of said chamber.

32. The mobile thermal desorption system as set forth in claim 30 and further including a blower in communication with said gas inlet of said chamber.

33. The mobile thermal desorption system as set forth in claim 30 wherein said separator is a high temperature baghouse.

34. The mobile thermal desorption system as set forth in claim 30 and further including a water treatment system in communication with said condenser.

35. The mobile thermal desorption system as set forth in claim 30 and further including a material handler in communication with said material inlet of said chamber.

* * * * *